United States Patent [19]

Kamerman

[11] Patent Number: 4,530,104
[45] Date of Patent: Jul. 16, 1985

[54] CIRCUIT FOR REDUCING ERRORS IN A DATA RECEIVER

[75] Inventor: Adriaan Kamerman, Nieuwegein, Netherlands

[73] Assignee: NCR Corporation, Dayton, Ohio

[21] Appl. No.: 509,490

[22] Filed: Jun. 30, 1983

[30] Foreign Application Priority Data

Jan. 12, 1983 [GB] United Kingdom ............... 8300732

[51] Int. Cl.³ ............................................. H03H 7/36
[52] U.S. Cl. ...................................... 375/14; 333/18; 375/99
[58] Field of Search ................ 375/12, 14, 99, 103; 333/17 R, 18; 455/246, 247, 312; 328/162; 329/104, 105, 110; 364/724, 825

[56] References Cited

U.S. PATENT DOCUMENTS

| 3,855,539 | 12/1974 | Croisier ........................... 329/104 |
| 3,967,102 | 6/1976 | McCown ........................ 333/17 R |
| 3,972,000 | 7/1976 | Desblache et al. ............. 329/105 |
| 4,091,331 | 5/1978 | Kaser et al. ..................... 329/110 |
| 4,253,184 | 2/1981 | Gitlin et al. ..................... 333/18 |
| 4,475,211 | 10/1984 | Mattis, Jr. et al. ............. 333/18 |

FOREIGN PATENT DOCUMENTS

| 1503610 | 3/1978 | United Kingdom . |
| 2048020 | 12/1980 | United Kingdom . |
| 2048620 | 12/1980 | United Kingdom . |
| 2064274 | 6/1981 | United Kingdom . |

Primary Examiner—Benedict V. Safourek
Attorney, Agent, or Firm—Albert L. Sessler, Jr.; George Jameson

[57] ABSTRACT

In a data receiver, a complex data signal after demodulation and sampling is applied to an equalizer which provides an improved signal which is applied to a phase and amplitude correction circuit for correction utilizing a complex reference vector. The corrected signal is applied to a decision circuit the input and output of which are applied to a difference determinator circuit, the output of which is a complex residual error signal utilized in conjunction with a plurality of gain factors generated in a gain factors generator to determine the reference vector. The gain factors vary in time from transmission initialization such that optimal compensation for transmission disturbances is achieved both at initialization and after stabilization.

12 Claims, 11 Drawing Figures

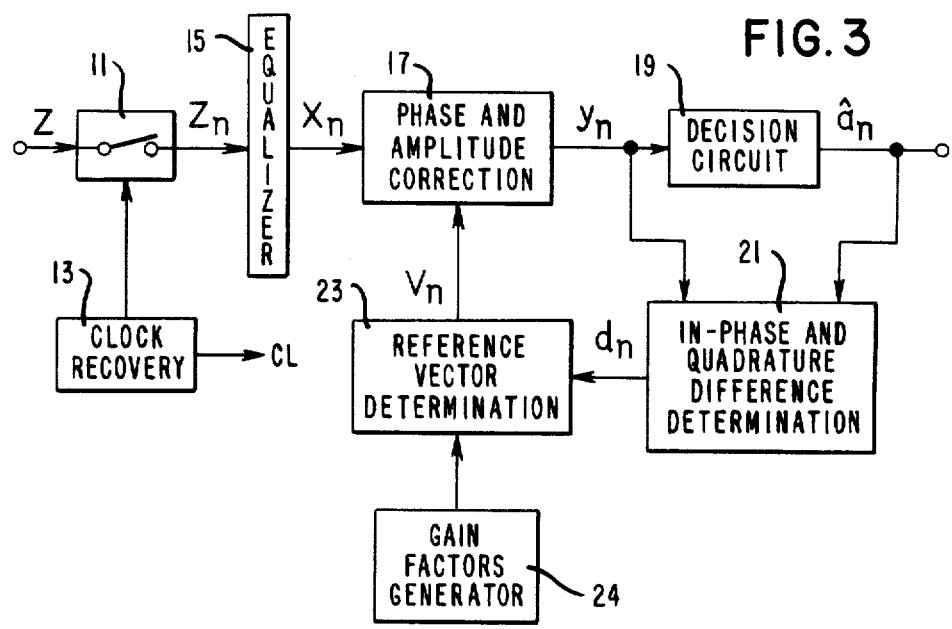

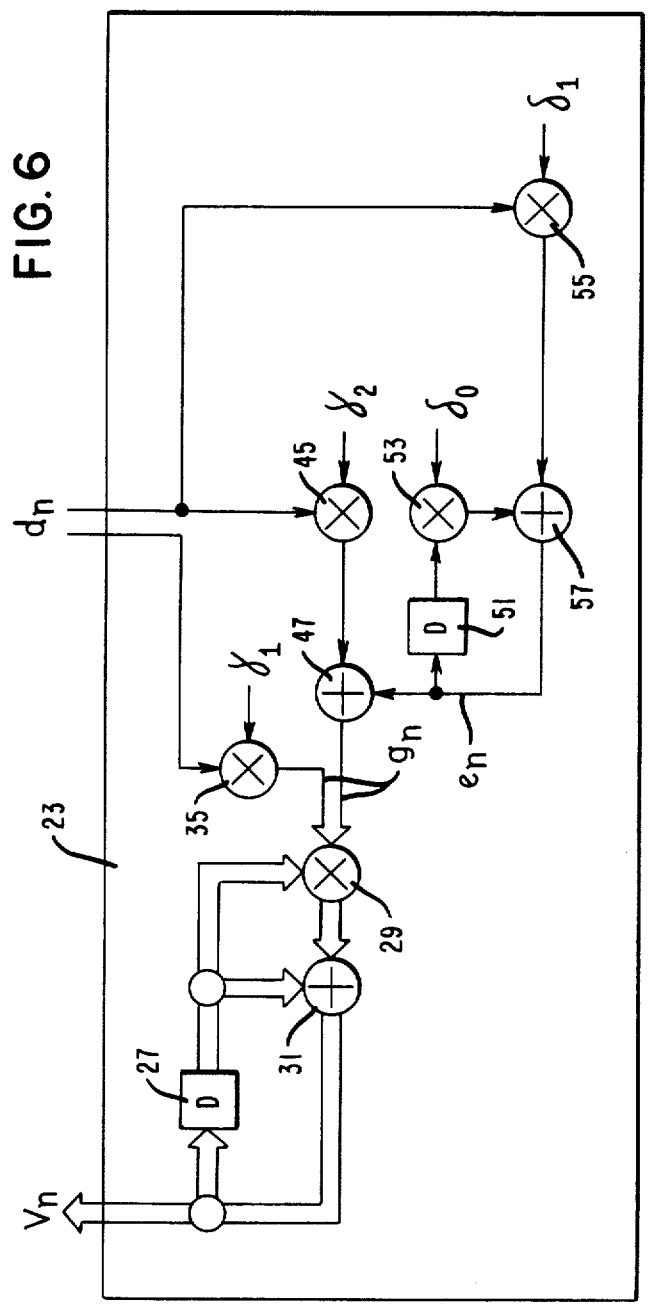

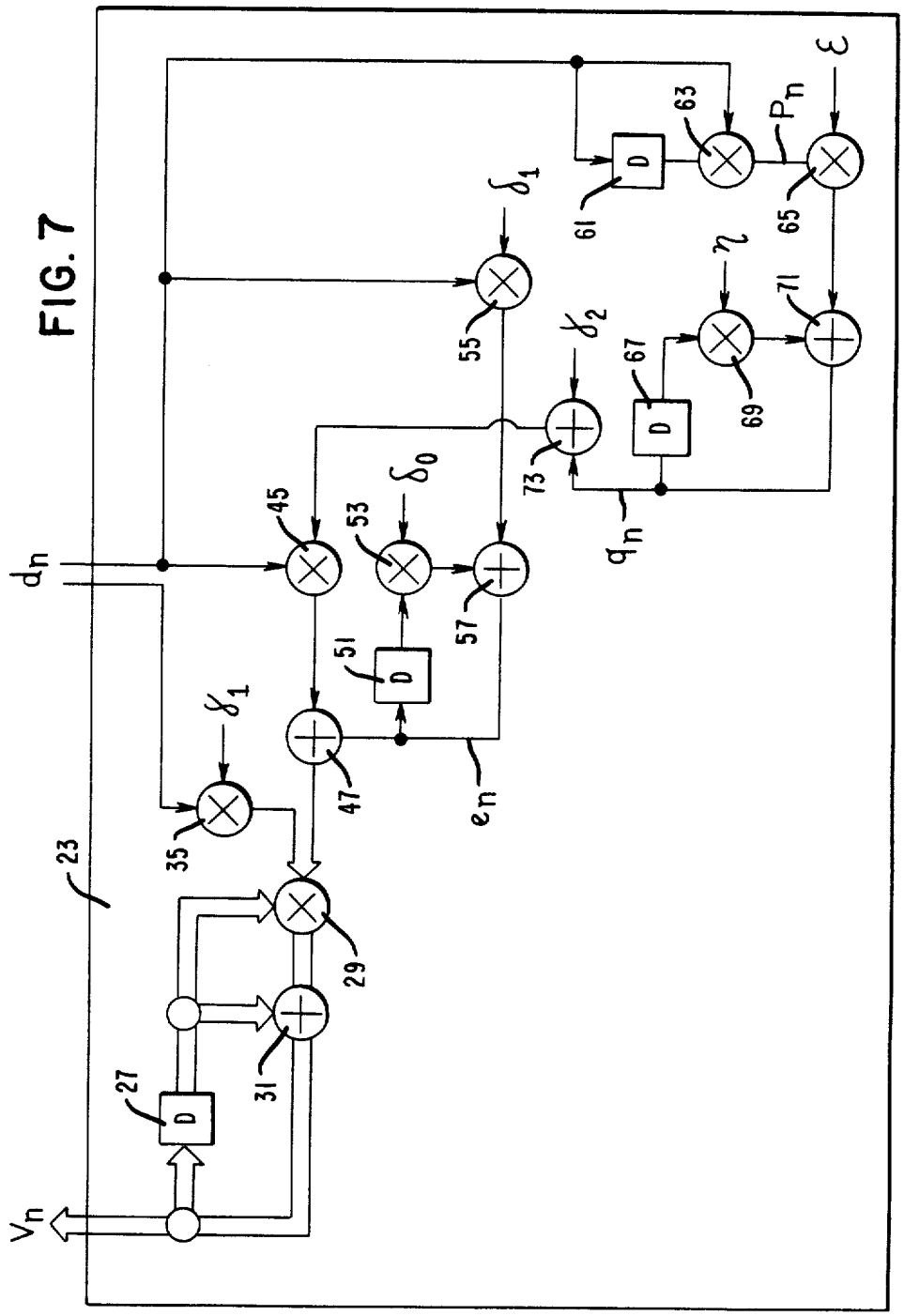

CIRCUIT FOR REDUCING ERRORS IN A DATA RECEIVER

BACKGROUND OF THE INVENTION

This invention relates to data receivers of the kind including circuit means compensating for transmission disturbances in a carrier-modulated transmission system, which circuit means includes a correction circuit for correcting a previously equalized received signal, a decision circuit responsive to the corrected received signal to provide output data signals, a difference determinator circuit coupled to an input and an output of said decision circuit and a correction factor determinator circuit coupled to an output of said difference determinator circuit and an input of said correction circuit.

Phase shift keying (PSK)—in particular differential PSK (DPSK)—and quadrature amplitude modulation (QAM) are presently used in many systems for data transmission. To represent n discrete data values, k different phase values are used by which a carrier signal is modulated at given clock times. The carrier signal is modulated to m different amplitude levels (for PSK: $m=1$) where $n \leq k.m$. The data values can also be represented by complex values distributed over m circles, with the zero point as the center. These complex values are then modulated by a complex carrier. Finally only the real part of the modulated carrier is transmitted, usually after filtering. A representation using complex signals for transmission systems with carrier modulation leads to a brief and clear mathematical description. In a technical implementation, however, pairs of real signals are used instead of complex signals. Preferably these real signals should be related to the complex signals according to the complex number calculus.

Assuming error free transmission, the discrete values transmitted would arrive at the receiver after demodulation of two carrier waves, shifted 90° with respect to each other, by which a complex baseband signal is generated, at sampling instants which were suitably derived. Since disturbances such as: signal distortion (intersymbol interference), additive noise, frequency shift, phase jitter, phase hits, gain variation, always occur during transmission, a suitable means for error compensation must be provided in the receiver. It is practice in the art, to use equalizers for eliminating signal distortion (intersymbol interference). Some of these equalizers can adapt their characteristics to varying distortion conditions.

A data receiver of the kind specified is known from U.S. Pat. No. 4,091,331. In the known system the difference determinator provides an output representing the phase difference between the phases of the input and output signals of the decision circuit. This phase difference is fed to a phase error predictor circuit which includes a feedback path and which is controlled by a gain control signal adaptively set in accordance with the ratio between phase jitter and additive noise.

Although the known circuit does result in improved performance where the ratio between phase jitter and additive noise varies, the known circuit has the disadvantage that an undesirable high number of errors does still occur.

SUMMARY OF THE INVENTION

It is an object of the present invention to provide a data receiver of the kind specified wherein the aforementioned disadvantage is alleviated.

Therefore, according to the present invention, there is provided a data receiver of the kind specified, characterized in that the difference determinator circuit is responsive to complex signals representing the corrected received signals and the output data signals to provide complex residual error signals, and in that the correction factor determinator circuit is responsive to the complex residual error signals and to a gain control signal varying in a time dependent manner from an initial signal value when the receiver initially starts to receive transmitted data to a final signal value different from the initial value, whereby the correction factor determinator circuit provides a complex reference signal applied in operation to the correction circuit for compensating for phase and amplitude errors in the data receiver.

It will be appreciated that in a circuit according to the invention, since the gain control signal varies in accordance with the time state of the receive process an improved compensation for transmission disturbances is obtained as compared with the known system, in that the occurrence of errors is reduced, since good compensation for errors can be achieved both at initialization and after stabilization.

BRIEF DESCRIPTION OF THE DRAWINGS

The invention will now be described by way of example with reference to the accompanying drawings, in which:

FIG. 3 is a block diagram of a receiver (without demodulator stage) for recovering discrete data values which were transmitted by modulating the phase and amplitude of a carrier at discrete times;

FIG. 4 illustrates, in a signal flow diagram, the details of a circuit arrangement, helpful in understanding the present invention, that consists of a single proportional feedback loop;

FIG. 5 illustrates, in a signal flow diagram, the details of a circuit arrangement, helpful in understanding the present invention, that consists of a proportional and differential feedback loop;

FIG. 6 illustrates, in a signal diagram, the details of the reference vector determinator included in the circuit of FIG. 3;

FIG. 7 illustrates another embodiment of the reference vector determinator included in the circuit of FIG. 3;

DESCRIPTION OF THE PREFERRED EMBODIMENT

Figure 1:
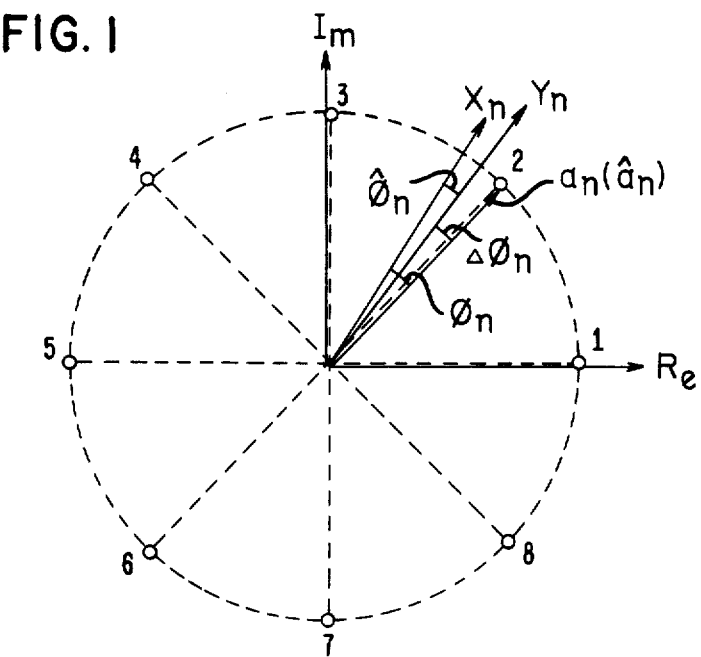
FIG. 1 is a vector diagram illustrating the discrete states and errors that occur in phase shift keying modulation with eight phases (8-PSK)

Referring first to FIG. 1, there is shown a signal diagram representing the eight possible discrete states of the signal parameter in an eight-phase PSK transmission system. Each of the eight different states, designated 1 to 8 in FIG. 1 represents a different three-bit code word. Each state corresponds to a complex value, or "pulse amplitude", which can be represented either as $a_n = \exp(j\phi_n)$ or as $a_n = a_{R_n} + ja_{I_n}$, where $a_{R_n}$ is termed the in-phase component and $a_{I_n}$ the quadrature component.

Figure 2:
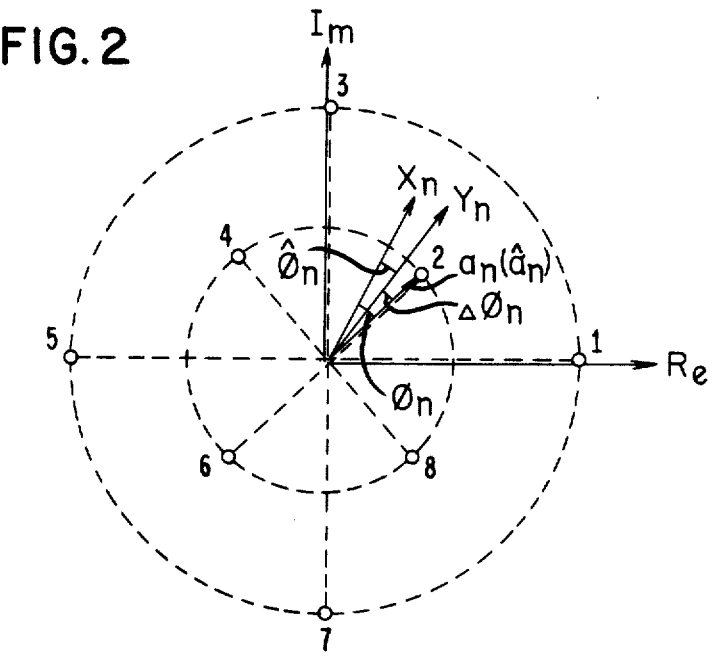
FIG. 2 is a vector diagram illustrating the discrete states and errors that occur in quadrature amplitude modulation with eight target points (8-QAM)

FIG. 2 shows, in a similar way to FIG. 1, a signal diagram representing the eight possible discrete states of the signal parameter in a 2-amplitude, 8-phase quadrature amplitude modulation (QAM) transmission system. The complex value $a_n = c_n \cdot \exp(j\phi_n)$, where $c_n$ is the amplitude.

The system is considered time-discrete, i.e. the discrete values of the signal parameters are defined only for given "sampling times", that occur with period T.

In a transmitter, a carrier signal, e.g. a sinusoidal wave, is modulated in a known manner at each sampling time by one of the eight discrete complex pulse amplitudes $a_n$ (as shown in FIGS. 1 and 2). This may be effected by modulating a complex carrier $\exp(jw_ct)$ in phase and amplitude by a complex value $c_n \cdot \exp(j\phi_n)$ and transmitting the real part thereof:

$$\text{Re}\,[c_n \cdot \exp(j\phi_n) \cdot \exp(jw_ct)]$$

FIG. 3 shows a receiver in which a demodulated complex signal z (in-phase and quadrature components) is sampled by a sampler 11 at intervals T, the sampling times being determined by a clock recovery circuit 13 which derives clock pulses from the received signal. The clock recovery circuit 13 also provides clock signals CL for other units. From the sample values $z_n$ thus obtained, the received pulse amplitude $\hat{a}_n$ must be determined for recovering the transmitted information. A decision circuit 19 is provided for this purpose. However, during transmission the signal is subject to several disturbances, depending on the characteristics of the transmission medium, such as signal distortions, additive noise, phase jitter, phase hits and small gain hits.

Signal distortion is compensated for by an equalizer 15, which operates in discrete time, to obtain an improved signal $x_n$ as shown in FIGS. 1 or 2.

However, this signal is still disturbed by phase jitter, additive noise and hits which must be reduced to the largest possible extent to allow correct pulse amplitude determination. To allow phase tracking, a phase and amplitude correction device 17, is provided, that will reduce phase errors and amplitude errors by multiplication with the complex conjugate of a reference vector $v_n$. The resulting value $y_n = x_n \cdot v_n^1$ still has residual phase errors and amplitude errors. A reference vector determinator 23, generates a new reference vector $v_{n+1}$ from the previous reference vector $v_n$ and the estimated in-phase and quadrature error components, in dependence on gain factors derived from a gain factors generating circuit 24, as will be more fully described hereinafter. These estimated errors are derived from the residual errors in a difference determinator circuit 21.

[1]. the quantities $\phi_n$ and $\Delta\phi_n$ are real values in contrast to the complex-value quantities $\hat{a}_n$, $z_n$, $x_n$, $y_n$ and $d_n$.

A decision circuit 19 determines the output value $\hat{a}_n$ from $y_n$ by selecting, from one of the eight discrete pulse amplitudes, the one which is closest to $y_n$. The difference determinator for the in-phase and quadrature component 21, receives both $y_n$ and $\hat{a}_n$ and furnishes the value of the residual error $d_n$ with an in-phase and a quadrature component, as input to the reference vector determinator 23. In good approximation the quadrature component $Im(d_n) = Im(y_n \cdot a_n^2) = \phi_n$, assuming that $|y_n| \cdot |\hat{a}^*_n| = |y_n| \cdot |\hat{a}_n| \approx 1$.

[2]. $\hat{a}^*_n$ stands for the complex conjugate of $\hat{a}_n$

The circuit illustrated in FIG. 4 is explanatory of one aspect of an implementation for determining the reference vector. Referring to FIG. 4, a feedback path for obtaining a revised value $v_n$ for the reference vector includes a multiplier 35, in which the residual error signal from the circuit 21 is multiplied by a given factor $\gamma$. The weighted residual error $\gamma \cdot d_n$ is fed to a second multiplier 29, where the weighted residual error is multiplied with the reference vector $v_n$ from delay element 27. This delay element 27 has a delay time of one sampling period T.

The result of this last multiplication $v_n \cdot \gamma \cdot d_n$ is added in an adder 31 to the value of the reference vector. The arrangement consisting of elements 35, 27, 29 and 31 provides a new value of the reference vector according to the equation $v_{n+1} = v_n + v_n \cdot \gamma \cdot d_n$. (Note that the quantity $\gamma$ is a real value in contrast to the complex value quantities $v_n$ and $d_n$.)

The circuit illustrated in FIG. 5, also explanatory of certain aspects of an implementation for determining the reference vector, illustrates in addition to components corresponding to those in FIG. 4, a differential feedback loop the function of which is to compensate for frequency shift. Thus, the circuit of FIG. 5 additionally includes a multiplier 55, a delay element 51, and adders 57 and 37. The residual error $d_n$ is weighted by multiplication with factor $\delta$ in 55, the result is added in the adder 57 to the contents of the delay element 51. The result of the addition in the adder 57, $e_n$, is an integrated residual error $$\sum_n d_n.$$

This value is added in the adder 37 to the weighted residual error $\gamma \cdot d_n$. (Note that the quantity $\delta$ is a real value.)

Referring now to FIG. 6, which shows an implementation of the reference vector determinator 23, double lines are used for complex value quantities and single lines for real or imaginary value quantities. It will be appreciated that, in a practical embodiment, complex valued quantities are represented by pairs of real valued quantities derived during the demodulation operation and real valued quantities are represented by digital signals. Furthermore, it should be understood that the various digital processing circuits such as adders, multipliers and delays may be implemented by a digital signal processor integrated circuit. It is assumed that the disturbances still present in $x_n$ (see FIG. 3), i.e. after equalization are: noise, frequency shift, phase jitter, changes in nominal amplitude (small gain hits), and phase hits. Changes in amplitude can be introduced by several reasons, e.g. by impulse noise. The real part (in-phase component) of $d_n$ is multiplied in the multiplier 35 with a factor $\gamma_1$. This provides one input to the proportional feedback circuit for amplitude correction. The result of this multiplication forms the real part of a complex value $g_n$, the output from an adder 47 forming the imaginary part of $g_n$. The complex value $g_n$ constituted by its real part from the multiplier 35 and imaginary part from the adder 47, is multiplied in the multiplier 29 with the output signal from the delay element 27. The processing of the imaginary part up to the adder 47 is realized in a similar way to that shown for the complex values in FIG. 5 (up to adder 37), except for the provision of a multiplier 53 which is coupled to the output of the delay element 51. The factor $\delta_0$ applied to the multiplier 53 controls the decrease in contribution of the contents of the delay element 51, $e_n$, to the addition in 57. (Note that $e_n$ and $\gamma_1$, $\gamma_2$, $\delta_1$, $\delta_0$ are real valued quantities with $0<\gamma_1<1$, $0<\gamma_2<1$, $0<\delta_1<1$, $0<\delta_0<1$).

It will be appreciated that $e_n$ approximates a value that minimizes the averaged value of the quadrature component (imaginary part) in the residual error $d_n$. This value $e_n$ would correspond to an average phase error in $x_n$ caused by frequency shift. (Note that for small $\alpha$, $\sin\alpha \approx \alpha \approx \tan\alpha$).

Another embodiment of the reference vector determinator 23 will now be described with reference to FIG. 7. In FIG. 6 the quadrature component (imaginary part) of $d_n$ was multiplied by a factor $\gamma_2$ in the multiplier 45. In FIG. 7 a contribution $q_n$ is added to $\gamma_2$ in an adder 73. This contribution $q_n$ is derived from the quadrature component of $d_n$. The instantaneous correlation present in the quadrature component of $d_n$, $p_n$ is derived by multiplication in a multiplier 63 of the quadrature component of $d_n$ and its previous value, provided by a delay element 61. The averaged correlation $q_n$ is derived from $p_n$ after multiplication in a multiplier 65 by a factor $\epsilon$ and addition in an adder 71. The previous value of $q_n$, provided by a delay element 67, is multiplied in a multiplier 69 by a factor $\tau$. The result of this multiplication and that from the multiplier 65 are added in an adder 71. The value of $q_n$ is a measure of the averaged correlation in the quadrature component of $d_n$. (Note $p_n$, $q_n$, $\epsilon$, and $\tau$ are real valued quantities with $0<\epsilon<1$, $0<\tau<1$).

Figure 8:
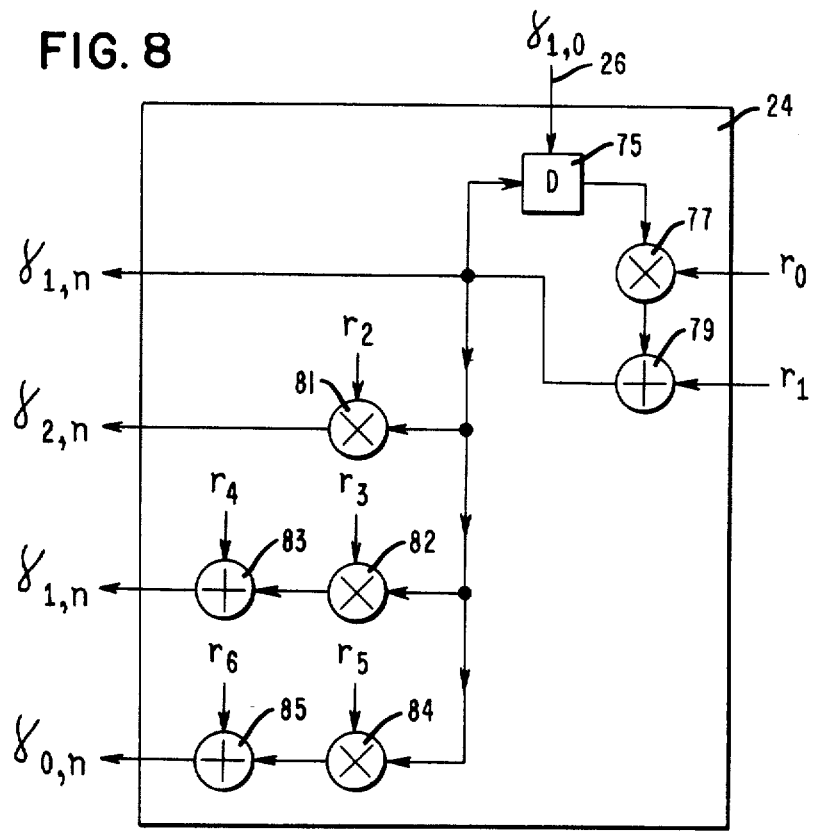
FIG. 8 illustrates, in a signal diagram, the details of the gain factors generator included in the circuit of FIG. 3.

The gain factors generator circuit 24 illustrated in FIG. 8 generates the factors $\gamma_{1,n}$, $\gamma_{2,n}$, $\delta_{1,n}$, $\delta_{0,n}$. These factors have initial values $\gamma_{1,0}$, $\gamma_{2,0}$, $\delta_{1,0}$, $\delta_{0,0}$, the values stabilizing finally at $\gamma_1$, $\gamma_2$, $\delta_1$, $\delta_0$, respectively. It should be understood that these final values are optimal under stable circumstances.

The circuit 24 includes a feedback loop including a delay element 75 having an output coupled to a multiplier 77, an output of which is coupled to an adder 79 having an output fed back to an input of the delay element 75. The output of the adder 79 forms an output of the feedback loop for providing the factor $\gamma_{1,n}$ from which are provided the gain factors $\gamma_{2,n}$, $\delta_{1,n}$ and $\delta_{0,n}$ as will now be described.

The content of the delay element 75 is set initially to $\gamma_{1,0}$ over an input line 26. Multiplication by a factor $r_0$ in the multiplier 77, and addition of $r_1$, in the adder 79 results after the first time interval in $\gamma_{1,1}$. Thereafter, the delay element 75 behaves as a normal delay element, and $\gamma_{1,n}$ is produced from the output of the adder 79. A multiplier 81 produces $\gamma_{2,n}$ from $\gamma_{1,n}$ and the factor $r_2$. An adder 83 produces $\delta_{1,n}$ from the output of the multiplier 82 and the constant $r_4$. An adder 85 produces $\delta_{0,n}$ from the output of the multiplier 84 and constant $r_6$. (Note $\gamma_{1,n}$, $\gamma_{2,n}$, $\delta_{1,n}$, $\delta_{0,n}$ and $r_0$, $r_1$, $r_2$, $r_3$, $r_4$, $r_5$, $r_6$ are real value quantities).

Figure 10:
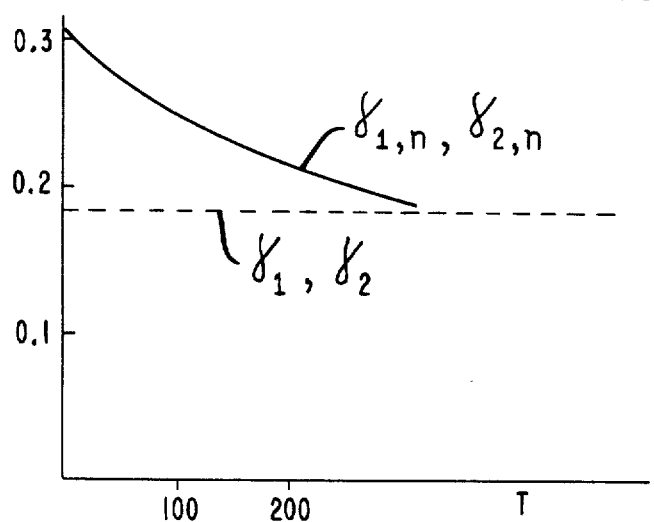
FIGS. 10 and 11 illustrate the time variation of the gain factors generated by the circuit of FIG. 8.
Figure 11:
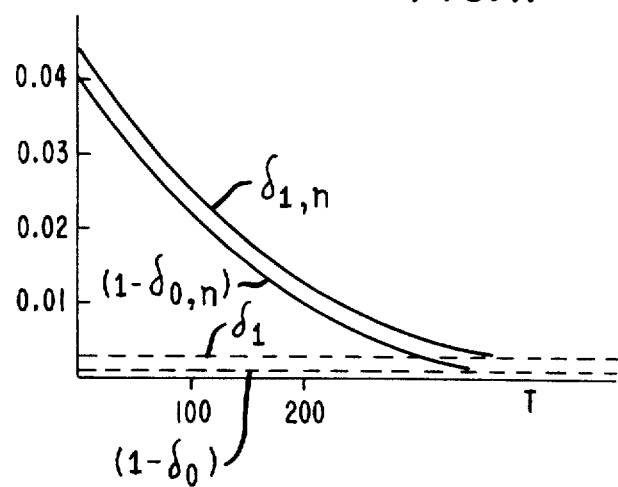

The time variation of the factor $\gamma_{1,n}$ and $\gamma_{2,n}$ with respect to the number of time intervals T is shown in FIG. 10 and the time variation of the factors $\delta_{0,n}$ and $\delta_{1,n}$ with respect to the number of time intervals T is shown in FIG. 11.

In an environment where the receiver is connected to multiple transmitters each having their own transmission path, the behavior of the receiver immediately after the start of receiving requires special attention. Fast and proper initialization, followed by a fast stabilization of the circuit shown in FIGS. 6 or 7, will save inactive time in the beginning of a new transmission period. For short transmission periods, with receiver input from different transmission paths, this behavior is of special interest.

In the gain factors generator circuit 24, the factors are initially set at $\gamma_{1,0}$, $\gamma_{2,0}$, $\delta_{1,0}$, $\delta_{0,0}$ and will finally converge to $\gamma_1$, $\gamma_2$, $\delta_1$, $\delta_0$, the latter being their optimal values after stabilization. The values $\gamma_1$, $\gamma_2$, $\delta_1$, $\delta_0$ should be optimal for the type of modulation and the signalling rate that is used and the disturbances that can be expected in $x_n$, i.e., after equalization.

Since the integration loop in FIGS. 6 and 7, consisting of the elements 51, 53, 57 and 55 is intended to compensate for frequency shift, $\delta_1$ should be close to 0 and $\delta_0$ close to 1. It will be appreciated that the values of $\delta_1$ and $\delta_0$ determine the speed and gain of the integration loop.

Initially, the content of the delay element 51, FIGS. 6 and 7, is set to 0, and should converge to a quantity corresponding to the phase offset during one sampling period T introduced by frequency shift. The content $e_n$ of the delay element 51 is derived by the following equations:

$$e_0 = 0$$

$$e_n = \delta_{1,n} \cdot Im(d_n) + \delta_{0,n} \cdot e_{n-1} \quad n \geq 1$$

For accurate frequency shift compensation in the presence of disturbances other than frequency shift (like noise and phase jitter) $\delta_1$ should be close to 0 and $\delta_0$ should be even closer to 1.

In the period shortly after initialization when n is a small number, a small value for $\delta_{1,n}$ will cause a slow stabilization of $e_n$, a high value for $\delta_{1,n}$ will introduce a contribution from phase jitter and noise in $e_n$. In the present embodiment a $\delta_{1,n}$ decreases from a relatively high value to a low value. The disturbance in $e_n$, introduced by phase jitter and noise, during the intervals after start up, can be diminished by choosing $\delta_{0,n}$ to be less than 1. However, when $\delta_{0,n}$ differs from 1 the frequency shift compensation is reduced. Therefore $\delta_{0,n}$ is caused to increase to 1. The decrease of $\delta_{1,n}$ and the increase of $\delta_{0,n}$ should be optimal for the fast stabilization of frequency shift compensation in the presence of noise and phase jitter during transmission.

The gain factors $\gamma_{1,n}$ and $\gamma_{2,n}$ are initially at higher values than their optimal values after stabilization, namely $\gamma_1$ and $\gamma_2$.

Furthermore, to diminish the negative effect of the contribution of $q_n$ (see FIG. 7) in the periods shortly after initialization, $\epsilon$ is selected to be very small, whereby $q_n$ will therefore increase slowly to its final value in the stabilized state. The contribution of $q_n$ in the periods shortly after initialization is not significant.

The arrangement illustrated in FIG. 8 to derive the gain factors $\gamma_{1,n}$, $\gamma_{2,n}$, $\delta_{1,n}$ and $\delta_{0,n}$ can be described by the following equations:

for $n > 1$:

-continued $$\gamma_{1,n} = r_1 + r_0 \cdot \gamma_{1,n-1}$$

$$= r_1 \cdot \left(\sum_{j=1}^{n-1} r_0^j\right) + r_0^n \cdot \gamma_{1,0}$$

$$= r_1 \cdot \frac{(1 - r_0^n)}{1 - r_0} + r_0^n \cdot \gamma_{1,0}$$

$$\gamma_{2,n} = r_2 \cdot \gamma_{1,n}$$

$$\gamma_{1,n} = r_3 \cdot \gamma_{1,n} + r_4$$

$$\delta_{0,n} = r_5 \cdot \gamma_{1,n} + r_6$$

Since $0 < r_0 < 1$ the factors $\gamma_{1,n}$, $\gamma_{2,n}$, $\delta_{1,n}$, $\delta_{0,n}$ will converge to respectively $\gamma_1$, $\gamma_2$, $\delta_1$, $\delta_0$:

$$\gamma_{1,n} \rightarrow \gamma_1 = \frac{r_1}{1 - r_0}$$

$$\gamma_{2,n} \rightarrow \gamma_2 = \frac{r_2 \cdot r_1}{1 - r_0}$$

$$\delta_{1,n} \rightarrow \delta_1 = \frac{r_3 \cdot r_1}{1 - R_1} + r_4$$

$$\delta_{0,n} \rightarrow \delta_0 = \frac{r_5 \cdot r_1}{1 - r_0} + r_6$$

Figure 9:
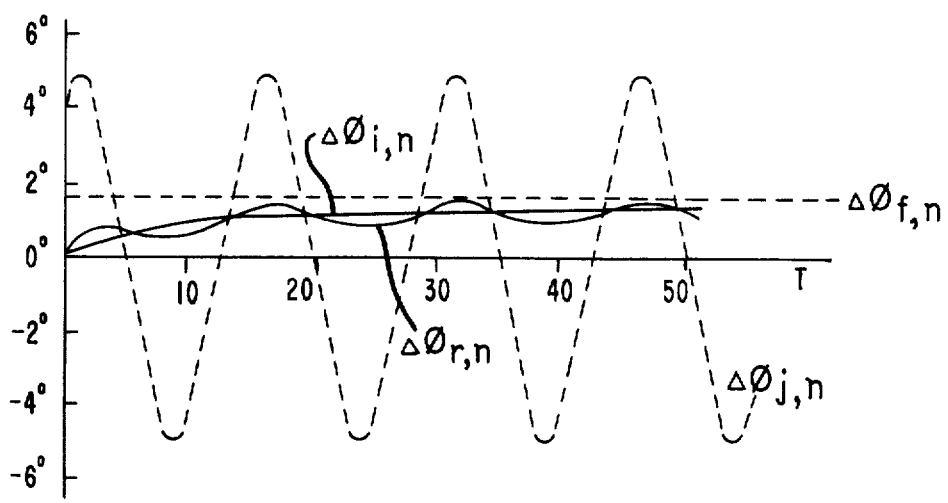
FIG. 9 illustrates, in graphical form, an example of the introduction of phase errors caused by frequency shift and phase jitter, and the compensation of the phase error in case of frequency shift.

FIG. 9 shows an example of frequency shift and phase jitter disturbances present in $x_n$, i.e., after equalization. The x-axis in FIG. 9 represents the number of intervals T. In this example a frequency shift of 7 Hz, and sinusoidal phase jitter of 10° peak-to-peak and 180 Hz repetition is assumed. In the receiver with a 1600 Baud signalling rate, 7 Hz frequency shift corresponds to 1.575° phase change per sampling period T (or symbol interval), $\Delta\phi_{f,n}$. In FIG. 9, the phase jitter corresponds to phase changes between $-1.6°$ and $+1.6°$ per sampling period T. In this FIG. $\Delta\phi_{i,n}$ and $\Delta\phi_{r,n}$ represent respectively the ideal and realized phase error compensation. The alternation in $\Delta\phi_{r,n}$ with respect to $\Delta\phi_{i,n}$ decreased in correspondence with a decrease in $\delta_{1,n}$. The differences between $\Delta\phi_{r,n}$ and $\Delta\phi_{i,n}$ have to be diminished because this kind of phase difference, introduced by phase jitter, results in lagging. In practice the phase of $x_n$ will be disturbed also by other effects such as noise.

Experimental results for an 4800 bps QAM modem receiver in the presence of various disturbances led to a set of favorable factor values.

These disturbances were:
noise, C-message weighted, SNR (signal-to-noise ratio) 12–40 dB
frequency shift. 0–10 Hz
phase jitter, 0–10° with repetition 50–200 Hz
and the factor values:

| $\gamma_{1,0} = 0.31;$ | $\gamma_1 = 0.18$ |
| $\gamma_{2,0} = 0.31;$ | $\gamma_2 = 0.18$ |
| $\delta_{1,0} = 0.044;$ | $\delta_1 = 0.002$ |
| $\delta_{0,0} = 0.958;$ | $\delta_0 = 0.99994$ |

(It should be understood that C-message noise is the total frequency weighted noise measured in the absence of a signal).

During these experiments $q_n$ (see FIG. 7) was kept to 0 by selecting the factor $\epsilon = 0$. These experimental results were concerned with the probability of an error in the first 80 or 800 bits after the receiver training and with the probability of bit errors after stabilization.

The decrease in $\gamma_{1,n}$, $\gamma_{2,n}$, and $\delta_{1,n}$, and the increase in $\delta_{0,n}$ were realized by selecting suitable values for $r_0$, $r_1$, ..., $r_6$ (see FIG. 8; $0 < r_i < 1$ for $i = 1, 2, 3, 6$ and $-1 < r_i < 0$, if $i = 4, 5$).

The experimental results were most favorable for a decrease in $\gamma_{1,n}$, $\gamma_{2,n}$, $\delta_{1,n}$ and increase in $\delta_{0,n}$ realized by a factor $r_0 = 0.9946$ and addition constant $r_1 = 0.00098$.

Using the same 4800 bps modem as above, experiments were made where the contribution of $q_n$ was used. Most favorable factor values were:

| $\gamma_{1,0} = 0.31;$ | $\gamma_1 = 0.15$ |
| $\gamma_{2,0} = 0.27;$ | $\gamma_2 = 0.11$ |
| $\delta_{1,0} = 0.044;$ | $\delta_1 = 0.001$ |
| $\delta_{0,0} = 0.956;$ | $\delta_0 = 0.99994$ |
| $\epsilon = 0.0625;$ | $\tau = 0.99976$ |

The allowable SNR LEVEL (only C-message noise was considered) for a bit error rate of $10^{-5}$ was 15.7 dB with the above set of factor values, and 16.1 dB with the set of constants for the situation where $q_n$ was kept 0 because $\epsilon = 0$. However, in the presence of hits, the last set of factor values delivers an inferior performance compared with those of the first experiment.

Initially the reference vector $v_n$ is set to a value $v_0 = 1/x_0$.

During an initialization that is part of a self-recovery operation, the factors $\gamma_{1,n}$, $\gamma_{2,n}$, and $\delta_{1,n}$ are advantageously set to larger values, the procedure for initializing the reference vector $v_n$ is the same as above and the manner of changing the factors $\gamma_{1,n}$, $\gamma_{2,n}$ and $\delta_{1,n}$ is maintained. When there exist large errors during detection, the error $d_n$ may exceed a certain threshold. When this occurs the reference vector is initialized again, keeping the instantaneous compensation $e_n$ stored in the delay element 51 unchanged and also keeping the equalizer 15 unchanged. Under very bad conditions during transmission, it can be hard to train the receiver according to the principles of self-recovery equalization. Saving the compensation $e_n$ that was built up during a self-recovery operation, and initializing the reference vector $v_n$ again is advantageous in such conditions. Experiments for a 4800 bps QAM modem in the presence of much disturbance resulted in favorable results with the following values for $\gamma_{1,n}$, $\gamma_{2,n}$, $\delta_{1,n}$, $\delta_{0,n}$ and:

| $\gamma_{1,0} = 0.4;$ | $\gamma_1 = 0.18$ |
| $\gamma_{2,0} = 0.4;$ | $\gamma_2 = 0.18$ |
| $\delta_{1,0} = 0.044;$ | $\delta_1 = 0.002$ |
| $\delta_{0,0} = 0.958;$ | $\delta_0 = 0.99994$ |
| $\epsilon = 0$ | |

I claim:

1. A system for reducing errors in a data receiver, said system comprising:
   means responsive to a complex reference signal for compensating for phase and amplitude errors in an input equalized received signal to provide a compensated received signal;
   means for developing an output data signal in response to said compensated received signal;

means for providing a complex error signal in response to said compensated received signal and said output data signal;
means for generating at least one gain factor signal; and
means responsive to said complex error signal and to at least one gain factor signal for producing said complex reference signal.

2. A system for reducing errors in a data receiver, said system comprising:
means responsive to a reference signal for compensating for phase and amplitude errors in an input equalized received signal to provide a compensated received signal;
means responsive to said compensated received signal for developing an output signal;
means responsive to said compensated received signal and said output signal for providing an error signal said error signal including an in-phase component and a quadrature component; and
means responsive to said error signal and to at least one gain factor signal for producing said reference signal, said producing means including a first circuit responsive to said quadrature component and to at least a first gain factor signal for providing a first signal which is compensated for frequency shift, and a second circuit responsive to said in-phase component, said first signal and to at least a second gain factor signal for providing said reference signal.

3. The system of claim 2 wherein said first circuit comprises:
first multiplier means for multiplying said quadrature component by said first gain factor signal to develop a first product signal;
first summer means for summing said first product signal and a second sum signal to produce a first sum signal;
means for delaying the second sum signal;
second multiplier means for multiplying the delayed second sum signal by a third gain factor signal to develop a second product signal;
third multiplier means for multiplying said quadrature component by a fourth gain factor signal to develop a third product signal; and
second summer means for summing said second and third product signals to produce said second sum signal.

4. The system of claim 3 wherein said second circuit comprises:
fourth multiplier means for multiplying said in-phase component by said second gain factor signal to develop a fourth product signal;
means for delaying said reference signal;
fifth multiplier means for multiplying a signal comprised of said first sum signal and said fourth product signal by said delayed reference signal to develop a fifth product signal; and
third summer means for summing said fifth product signal and said delayed reference signal to produce said reference signal.

5. The system of claim 4 further including:
a third circuit responsive to said quadrature component for providing an averaged correlation signal to modify said first gain factor signal, said first multiplier means being adapted to multiply said quadrature component by the modified first gain factor signal.

6. The system of claim 5 further including:
fourth summer means for summing said averaged correlation signal and said first gain factor signal to apply said modified first gain factor signal to said first multiplier means.

7. The system of claim 6 wherein:
said generating means generates first, second, third and fourth gain factor signals.

8. The system of claim 7 wherein:
said generating means causes each of said first, second, third and fourth gain factor signals to vary in a time dependent manner from an initial signal value when the receiver initially starts to receive transmitted data to a final signal value different from the initial value.

9. The system of claim 8 wherein:
said generating means causes said third gain factor signal to increase towards a value which is close to unity and said fourth gain factor signal to decrease towards a value which is close to zero.

10. A system in a data receiver for compensating for transmission disturbances in a received carrier-modulated transmission, said system comprising:
a correction circuit for correcting a previously equalized received signal to provide a corrected received signal;
a decision circuit responsive to the corrected received signal for providing an output data signal;
a difference determinator circuit responsive to said corrected received signal and said output data signal for providing a complex residual error signal;
means for generating a plurality of gain factor signals; and
a correction factor determinator circuit responsive to said complex residual error signal and to at least one of said plurality of gain factor signals for providing a complex reference signal to enable said correction circuit to correct the previously equalized received signal by compensating for phase and amplitude errors in said previously equalized received signal.

11. The system of claim 10 wherein:
said generating means causes each of said gain factor signals to vary in a time dependent manner from an initial signal value when the receiver initially starts to receive transmitted data to a final signal value different from the initial value.

12. The system of claim 11 wherein said complex error signal includes in-phase and quadrature components and said correction factor determinator comprises:
a first compensation circuit responsive to said quadrature component and to at least a first gain factor signal to provide a compensated signal which is compensated for frequency shift; and
a second compensation circuit responsive to said in-phase component, said compensated signal and to at least a second gain factor signal to provide said complex reference signal.

* * * * *